March 6, 1962 R. D. STROUT ET AL 3,024,016
SPRINGS FOR SEATS AND BACKS
Filed June 19, 1959 2 Sheets-Sheet 1
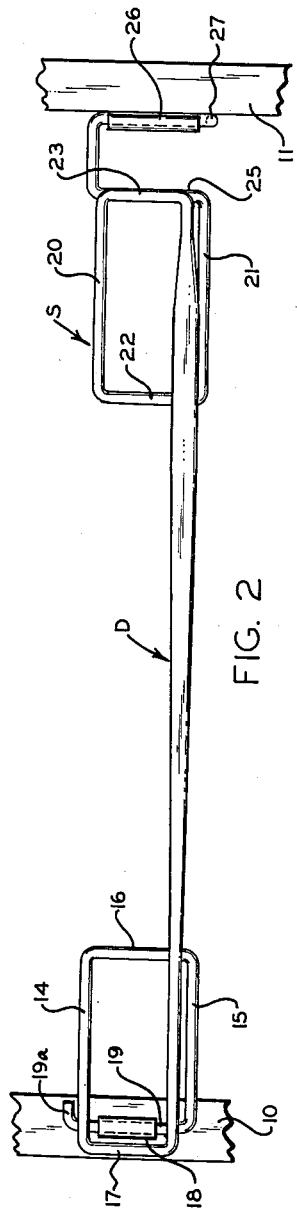
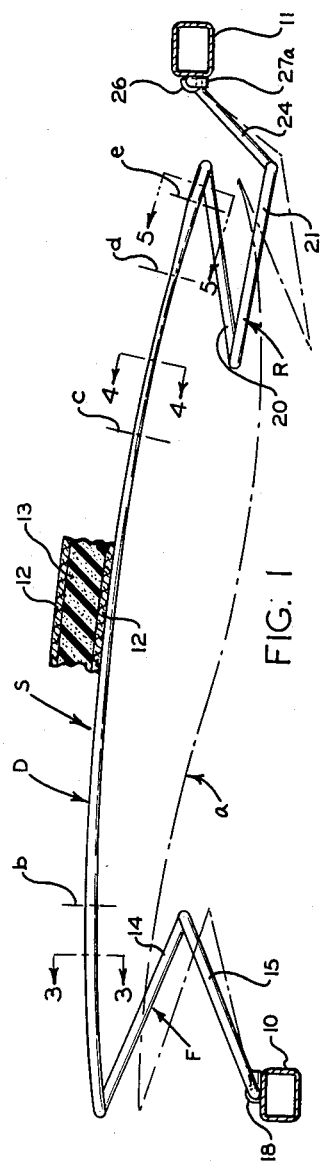
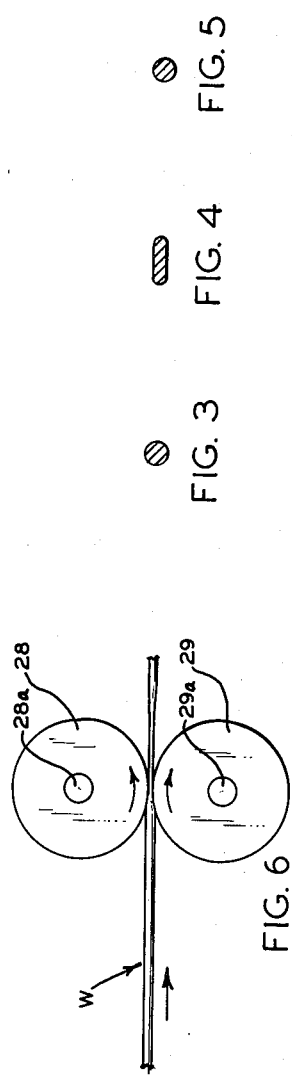
INVENTORS
RAYMOND D. STROUT
LYNN W. STAPLES
BY
*Fearman, Fearman, & McCulloch*
ATTORNEYS March 6, 1962
R. D. STROUT ET AL
3,024,016
SPRINGS FOR SEATS AND BACKS
Filed June 19, 1959
2 Sheets-Sheet 2
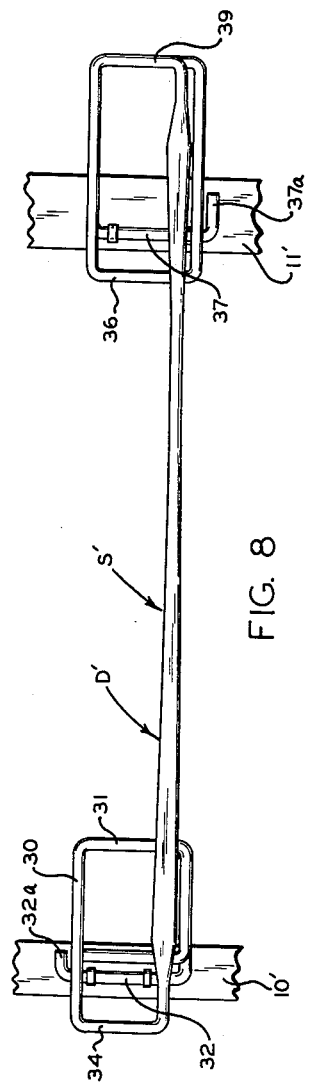
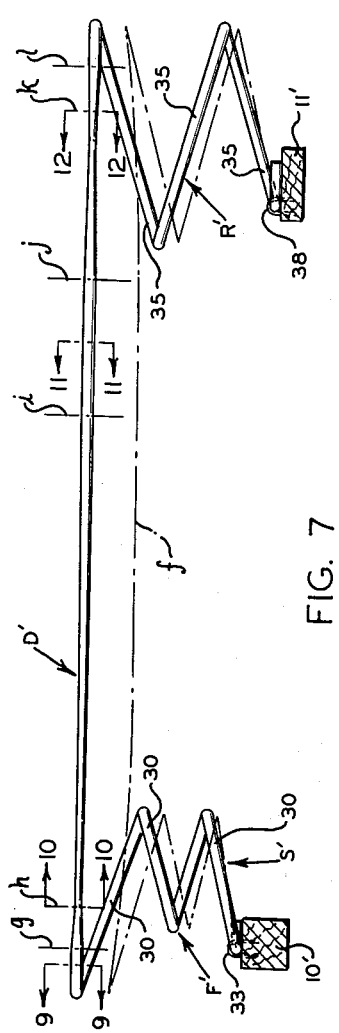
*INVENTORS*
RAYMOND D. STROUT
LYNN W. STAPLES
BY
ATTORNEYS

United States Patent Office 3,024,016
Patented Mar. 6, 1962

3,024,016
SPRINGS FOR SEATS AND BACKS
Raymond D. Strout, 5807 Baker, and Lynn W. Staples, 1630 Brockway, both of Saginaw, Mich.
Filed June 19, 1959, Ser. No. 821,412
13 Claims. (Cl. 267—1)

This invention relates to springs of the type employed in seats and backs in the automotive and furniture industries and to certain novel and useful improvements in springs which preferably have linear wire deck sections.

Presently, springs having sinuous wire deck sections are designed to provide a certain predetermined contour under load which is comfortable to the occupant and a formed spring strip of this type, which has predetermined deflection characteristics under the weight of an occupant, is disclosed in Patent No. 2,829,880. In the design of such springs areas of varying stiffness and different deflection, in accordance with the distributed load applied to the deck section, are most efficiently provided by varying the lengths of the torsion bars in the deck section. Springs are also presently employed in seats and backs in some instances which have straight or linear deck sections and cannot be classified as sinuous springs. The latter springs can be used in locations such as the rear seat in station wagons where comfort is sacrificed to economy. Less wire is, of course, used in a substantially linear deck section than in one of sinuous design. It has been suggested that part of a deck section of this type could be of circular cross-section and a part could be of generally oblong cross-section in a design in which the cross-sectional area of the spring over its length varies such that the depth or thickness of the spring in a vertical plane remains constant. Such a spring, wherein the depth dimension of the deck section remains constant does not provide a comfortable cushion spring which can assume the desired contour under load but is said to be longer lived because it gives protection against fatigue in an area where maximum plane flexure or shear takes place.

The instant invention involves a departure from known concepts of designing a spring deck section having predetermined deflection characteristics in accordance with the load to be applied, and it is believed provides for the first time a spring strip wherein the deck section can be substantially linear, which will assume a comfortable contour under the applied load. The invention is concerned with the discovery that the deflection at a particular point in a linear deck section is a direct function of, and is principally affected by, a value representing the moment of inertia of the cross section of the deck about the neutral axis at a particular point. Since the moment of inertia is primarily a function of the depth or vertical thickness of the deck section, this knowledge is employed in the design of the instant spring, which has portions of varying length tapered in depth and width. Broadly, the invention contemplates the provision of a spring having in the load application or deck section thereof portions of tapering depth which provide each increment of the length of the wire with a different deflection characteristic in desired areas so that a particular contour under load which is deemed to be most comfortable will be assumed. A deck section having such areas in combination with the normal circular cross section of the wire and also with areas in which the wire has an oblong cross-section provides a spring which will provide a more comfortable "feel" in an automobile seat, for instance. By varying the depth of a wire of uniform gauge throughout its length at desired points in the deck section, localized softness or stiffness can be varied in a ratio as much as four to one.

It is a prime object of the instant invention to provide a spring of the character described in which the desired contour under load can be obtained in a spring having a linear deck section, or substantially linear deck section, by varying the depth of the deck section incrementally and particularly with a wire of the same cross-sectional area throughout its length.

It is another object of the invention to provide a spring having a substantially straight or linear deck section which can be designed on the drafting board to provide a particular contour under load.

Another object of the invention is to provide a spring strip of the type described which is of such construction that minor changes can be made at localized points which permit changing the contour assumed under load to suit the differing requirements of different manufacturers.

It is a further object of the invention to provide a method of forming a spring of the character described which is efficient and highly reliable, and does not require expensive and complex die mechanism or the like.

Thus, important objects of the invention are to provide a spring strip having a substantially linear deck section designed to assume a predetermined contour under the load expected which can be economically produced on a mass production basis, and to provide a spring of reliable construction which uses a minimum amount of wire and accordingly permits the saving of inches of wire per spring.

With the above and other objects in view, the present invention consists in the combination and arrangement of parts hereinafter more fully described, illustrated in the accompanying drawing and more particularly pointed out in the appended claims, it being understood that equivalent changes may be made in the various elements which comprise the invention without departing from the spirit thereof or the scope of the sub-joined claims.

In the drawings:

FIGURE 1 is a side elevational view disclosing a vehicle seat spring assembly formed in accordance with the present invention;

FIGURE 2 is a top plan view thereof;

FIGURES 3, 4, and 5 are cross-sectional views taken on the lines 3—3, 4—4, and 5—5 of FIGURE 1, respectively;

FIGURE 6 is a side elevational view illustrating the manner in which the spring is formed;

FIGURE 7 is a side elevational view illustrating a furniture seat spring formed in accordance with the invention;

FIGURE 8 is a top plan view thereof; and

FIGURES 9, 10, 11, and 12 are cross-sectional views taken on the lines 9—9, 10—10, 11—11, and 12—12 of FIGURE 7, respectively.

Referring now more particularly to FIGURES 1–5 of the accompanying drawings, first of all, a letter S generally indicates a resilient wire spring strip constructed in accordance with the invention, which is shown in these views secured between the front and rear rails 10 and 11 of a conventional automotive seat frame. There will, of course, be a plurality of such spring strips connected between the front and rear rails of the frame at transversely spaced intervals, and joined by a border wire to form a spring cushion as in Flint Patent No. 2,684,844, for instance, and the springs will be covered with fabric 12 and padding 13 as usual. Each spring S has a deck section, identified by the letter D, which is supported between the frame sections 10 and 11 by a front end support section F and a rear end support section R.

The front end support section F comprises a pair of divergent leg portions 14 and 15 (FIGURE 1) joined by a torsion section 16 and is connected by a torsion bar 17 to the deck section D. Provided on the front frame member 10 is a clip 18 which accommodates a lowermost torsion section 19 and this section 19 has an angularly bent stub portion 19a, as shown, which permits section 19 to torsionally resist a load applied to the spring. The rear end support section comprises divergent leg portions 20 and 21, joined by torsion section 22, and is joined to the deck section by a torsion bar 23. A rear supporting arm 24, which forms a part of the rear end support section R and is joined to the leg portion 21 by a torsion section 25, supports the rear end of the deck section in a manner to provide substantially vertical depression of the rear end of the deck section D. Provided on the rear frame member 11 is a clip 26 which accommodates a rearmost torsion section 27 and it will be seen that torsion section 27 has an angularly bent stub end 27a which similarly permits it to torsionally resist loads applied to the spring S.

The deck section D is designed to assume the contour indicated by the diagrammatic line $a$ in FIGURE 1 and is divided into lengths of varying depth as shown in FIGURE 1. Generally speaking, the weight of the hips will be transferred to the springs at a point about two thirds of the length of the spring from the front end thereof, which in FIGURE 1 is substantially at the diagrammatic line identified by the letter $c$. This is the point of imposition of the maximum load. However, a distributed load is applied to the deck section over its length, of course, by the thighs of the occupant as well.

In a spring of the character described the deflection $(y)$ at a particular point is inversely proportional to the moment of inertia $(I)$ of the cross section at that point about the neutral axis. The relationship is expressed very well by the following formula:

$$y = \frac{M}{I}$$

(the letter M designating the bending moment at that point as a result of the imposed load).

The moment of inertia for the sections of wire formed herein can be expressed by the following formula:

$$I = \frac{bh^3}{12}$$

(Where $h$ is the depth of vertical dimension of the wire section and $b$ is its width.)

Accordingly, it will be seen that the deflection is a function of both the width and the height of the wire section but the depth or height of the wire section at a particular point principally determines or has far greater effect in determining the deflection at that point. When the depth $(h)$ of a particular portion of the deck section D is decreasing gradually, the incremental deflection $(y)$ of that particular section is increasing rapidly because the depth $(h)$ has a third power effect on deflection. The gradually varying width $(b)$ of the wire of the deck section (FIGURE 2) also affects the deflection which would decrease as the width increases if the depth $(h)$ remained the same, but, since in the instant case the width $(b)$ increases incrementally and proportionally as the depth $(h)$ decreases, it is the depth of the section which controls deflection. Thus, where the construction is such that the cross-sectional area of the spring remains the same throughout the length of the spring, a decrease in the depth of the spring will much more than cancel out the effect of an increase in the width of the spring.

In FIGURE 1 the front section F and the front portion of the deck section D to the diagrammatic line $b$ is formed of wire having its initial or usual circular cross-section or shape. In order to provide the predetermined contour desired, when a load is applied, the portion of the deck between diagrammatic lines $b$ and $c$ tapers in depth, as shown in FIGURE 1. Between the diagrammatic lines $c$ and $d$, near the rear of the deck section, the depth of the deck section is constant, as shown in FIGURE 4, after which it tapers again, and the rear end support section R and rear end portion of the deck section D are circular in cross-section from the diagrammatic line $e$, as shown in FIGURE 5.

In FIGURE 6 I have shown a pair of rolls 28 and 29 mounted on shafts 28a and 29a, respectively, which are employed to form the spring strip which has been described. Preferably, the speed of the rolls 28 and 29 is gauged to the speed of advance of the wire W and its length, such that in a complete revolution a length of wire corresponding to the linear length of a spring S passes through the varying nip between the rolls 28 and 29. The rolls 28 and 29 are, in effect, cam rolls with their peripheral surfaces sufficiently eccentric at desired points, as shown in FIGURE 6, to leave the ends of the wire which become the front and rear sections thereof of circular cross-section while flattening the various portions of the deck section D in the manner described. Since the wire W is originally of circular cross-section throughout its length, the cross-sectional area over its length will remain the same although its depth and width in the portion becoming the tapering portions of the deck section will vary as desired.

When the weight of an occupant is applied to the deck section D, the spring S is deformed to the comfortable contour indicated by the diagrammatic line $a$. In this deflected condition the various localized lengths over the length of the deck section D will be exerting a pressure against the occupant or resisting deflection in the manner desired for comfort.

In FIGURES 7–12 a spring S' which is designed for use as a furniture seat spring is shown mounted in position between the front and rear rails 10' and 11' of a furniture seat frame. In this case it is desired that the spring deflect under the weight of an average person in the manner indicated by diagrammatic line $f$ and the spring is designed with this purpose in mind. Each of the pluralities of springs S' which span the members 10' and 11' and make up the spring cushion comprise a deck section D', and a front end support portion F' and rear end support portion R'.

Provided for the front end support portion F' are divergent legs 30 connected by torsion sections 31 as shown and it will be seen that the lowermost leg section 30 is connected with a torsion section 32 with an angularly bent stub end 32a permitting it to torsionally resist deflection of the spring S'. A clip or staple 33 secures the front end support portion F' in position and a torsion bar 34 connects the front end support portion F' with the deck section D'.

The rear end support portion has divergent leg portions 35 connected by torsion sections 36 and the lowermost leg portion 35 is connected with a torsion section 37 having an angularly bent stub end 37a permitting it to torsionally resist a load applied to the spring S'. Clips or staples 38 similarly anchor the rear end support section R' and a similar torsion bar 39 connects the rear end support section R' and deck section D'.

The front end support section F' and very front portion of the deck section D' are of circular cross-section to the diagrammatic line $g$ and thence the depth of the wire of the deck section D' decreases in a tapering section as shown to the diagrammatic line $h$ which is also section line 10—10. From the diagrammatic line $h$ a tapering section of increasing depth is provided to the diagrammatic line $i$. Between the diagrammatic lines $i$ and $j$ the deck section is of circular cross-section and thence the wire decreases or tapers in depth gradually to the diagrammatic line $k$. Rearwardly of the diagrammatic line $k$, which is also the section line 12—12, a tapering section of increasing wire depth is provided between lines $k$ and $l$ joining with the rear end of the deck section D' and the rear support end section R' which are of circular cross-section. Since in this case an entirely different contour under load is desired, it will be noted that the depth of the wire section at the section line 11—11, which is located approximately two thirds of the length of the deck section D' from the front end thereof at the point of maximum load imposition, is considerably greater than the depth of the wire section of the spring shown in FIGURES 1 and 2 at the same point. In each case, of course, the deck section D' is designed to provide the contour desired and the support along the length of section D' is predetermined according to the specifications of particular manufacturers. A seat cushion rests on the deck sections of the springs S' forming the furniture seat cushion which are covered with a fabric in the usual manner.

The front and rear support sections F and R or F' and R' may also in some designs have legs 14, 15, 20, 21, 30, and 35 and connecting portions 16, 22, 31, and 36 shaped like deck portions D and D' with areas of tapering depth and width.

It is to be understood that the drawings and descriptive matter are in all cases to be interpreted merely as illustrative of the principles of the invention rather than as limiting the same in any way, since it is contemplated that various changes may be made to achieve like results without departing from the spirit of the invention or the scope of the appended claims.

In the claims:

1. In a vehicle spring structure; spaced apart support surfaces; a resilient wire spring strip spanning said surfaces including an elongated load engaging deck section having supporting front and rear end sections mounted by said support surfaces; at least one end section including a fishmouth section; said deck section consisting of a single length of wire of substantially the same cross-sectional area throughout linear over a substantial part of its length and having a section of circular cross-section at its front end, a section tapering by increasing in width while decreasing in depth and constituting a major portion of the length of the deck section, an oblong section of uniform width and depth, a section tapering by increasing in depth while decreasing in width, and a rear section of circular cross-section; at least one of said end sections also being substantially of circular cross-section.

2. In a furniture spring structure; spaced apart support surfaces; a resilient wire spring strip spanning said surfaces including an elongated, load engaging deck section having supporting end sections mounted by said support surfaces; said deck section consisting of a single linear length of wire of substantially the same cross-sectional area throughout having end portions of circular cross-section, a tapering section extending therefrom of increasing width and decreasing depth, a tapering section extending from said last section of decreasing width and increasing depth, and a section joining said latter tapering section of circular cross-section.

3. In a spring structure; spaced apart support surfaces; a resilient wire spring strip substantially spanning said surfaces including an elongated, load engaging deck section having supporting front and rear end sections mounted by said support surfaces; said deck section consisting of a single length of wire of substantially the same cross-sectional area throughout linear over a substantial portion of its length; said deck section having a section of circular cross-section at its front end, a section constituting a major portion of the length of the deck section tapering by changing gradually in width and depth in substantially the midportion of said deck section, and a section of uniform cross-section for a distance at approximately two thirds of the length of the deck section from the front end thereof.

4. In a spring structure; spaced apart support surfaces; a resilient wire spring strip substantially spanning said surfaces including an elongated, load engaging deck section having supporting end sections mounted by said support surfaces; said deck section consisting of a single length of wire of substantially the same cross-sectional area throughout, linear over a substantial portion of its length; said deck section having a portion of circular cross-section at its front end; a tapering section of increasing width and decreasing depth extending therefrom; and a tapering section extending rearwardly from said last section of increasing depth and decreasing width to approximately the mid-portion of the deck section.

5. In a spring structure; spaced apart support surfaces; a resilient wire spring strip including an elongated, load engaging deck section substantially spanning said surfaces and having supporting front and rear end sections; said front and rear end sections being mounted by said support surfaces; said deck section consisting essentially of a single length of wire of substantially the same cross-sectional area throughout, linear over a substantial portion of its length; said deck section having a cross-sectional shape according to the contour it is desired that the spring strip assume under load and including tapering section of greater length than obtained in mere conversions from sections of annular cross-section to a flattened section of uniform cross-section to constitute a substantially major portion of the length of the deck section, said tapering section tapering by changing gradually in width and depth to provide a predetermined contour in said portion of the length of the deck section under load; and a section of uniform cross-section connecting with a portion of said tapering section.

6. In a spring structure; frame means having spaced apart front and rear support surfaces; a resilient wire spring strip including an elongated, load engaging deck section substantially spanning said surfaces and having supporting front and rear end sections; said front and rear end sections being mounted by said support surfaces; said deck section consisting essentially of a length of wire of substantially the same cross-sectional area throughout, linear over a substantial portion of its length, and having a cross-sectional shape in accordance with the contour it is desired that the spring strip assume under load; said deck section having a tapering section of substantial length changing gradually in width and depth; and a second tapering section joined to and extending from said last section and changing oppositely in width and depth.

7. In a spring structure; spaced apart support surfaces; a resilient wire spring structure comprising an elongated, load engaging deck section substantially spanning said surfaces and supporting front and rear end sections mounting said deck section on said support surfaces; said load engaging deck section consisting essentially of a single length of wire of substantially the same cross-sectional area throughout, linear over a substantial portion of its length; said load engaging deck section having a cross-sectional shape according to the contour it is desired that the spring strip assume under load and including a portion of tapering section changing gradually in width and depth from near the front end of the deck section to near the rear end thereof.

8. In a spring structure; spaced apart support surfaces; a resilient wire spring strip comprising an elongated, load engaging deck section substantially spanning said surfaces and having supporting front and rear end sections; said front and rear end sections being mounted by said support surfaces; said deck section consisting essentially of a single length of wire of substantially the same cross-sectional area throughout, linear over a substantial portion of its length; said deck section having a cross-sectional shape according to the contour it is desired that the spring strip assume under load and including a section generally intermediate its end portions of substantially uniform cross-section from one location in the deck section at which the cross-section changes to another location in the deck section at which the cross-section changes, and tapering section of greater length than the section of substantially uniform cross-section outward of said section of substantially uniform cross-section, said tapering section tapering by changing gradually in width and depth over a substantial portion of the length of the deck section to provide a predetermined contour in said portion of the length of the deck section under load.

9. In a spring structure; spaced apart support surfaces; a resilient wire spring structure comprising an elongated, load engaging deck section substantially spanning said surfaces and supporting front and rear end sections; said front and rear end sections being mounted by said support surfaces; said deck section consisting essentially of a single length of wire of substantially the same cross-sectional area shaped according to the contour it is desired that the spring strip assume under load and including tapering section comprising a major portion of the length of the deck section and including lengths tapering by changing gradually in width and depth to provide a predetermined contour in said tapering section of the deck section under load.

10. A resilient wire spring structure comprising an elongated, load engaging, deck section having supporting front and rear end sections; said deck section consisting essentially of a single length of resilient wire of substantially the same cross-sectional area shaped according to the contour that it is desired that the spring strip assume under load and including substantially a major portion thereof tapering by changing gradually in width and depth to provide a predetermined contour in said tapering section of the deck section under load.

11. The combination defined in claim 10 in which at least one of said end sections is a fishmouth section.

12. A resilient wire spring structure comprising an elongated, load engaging deck section having supporting front and rear end sections; said deck section consisting essentially of a single length of resilient wire of substantially the same cross-sectional area shaped according to the contour that it is desired that the spring strip assume under load, and including front and rear end sections of uniform width and depth with substantially a major portion of the length of the deck section between said front and rear sections of uniform width and depth tapering by changing gradually in width and depth to provide a predetermined contour in said deck section under load.

13. In a spring structure; a resilient wire spring strip comprising an elongated, load engaging deck section having supporting front and rear end sections; said deck section consisting essentially of a single length of wire of substantially the same cross-sectional area throughout, linear over a substantial portion of its length; said deck section having a cross-sectional shape according to the contour it is desired that the spring strip assume under load and including sections of uniform cross-section at its ends, a section of circular cross-section for a distance at substantially two thirds of the length of the deck section from the front end thereof; and a pair of oppositely tapering sections tapering by changing oppositely in width and depth, both of which are formed in said deck section between said section of circular cross-section and one of said ends of uniform cross-section.

References Cited in the file of this patent

UNITED STATES PATENTS

| | | |
|---|---|---|
| 386,849 | Rippon | July 31, 1888 |
| 679,759 | Lanz | Aug. 6, 1901 |
| 2,085,963 | Ferm et al. | July 6, 1937 |
| 2,202,301 | Probst | May 28, 1940 |
| 2,829,880 | Staples et al. | Apr. 8, 1958 |
| 2,886,311 | Flint | May 12, 1959 |
| 2,910,115 | Meyers | Oct. 27, 1959 |